(12) United States Patent
Kim et al.

(10) Patent No.: US 6,248,818 B1
(45) Date of Patent: Jun. 19, 2001

(54) POLYTHIOPHENE-BASED CONDUCTIVE POLYMER LIQUID COMPOSITION OF HIGH CONDUCTIVITY AND TRANSPARENCY

(75) Inventors: Hyun Don Kim, Tajeon; Hae Ryong Chung, Suwon; Min Kyo Cheong, Seoul; Tu Won Chang, Tajeon, all of (KR)

(73) Assignee: Samsung General Chemicals Co. Ltd., Seosan-Shi (KR)

( * ) Notice: Subject to any disclaimer, the term of this patent is extended or adjusted under 35 U.S.C. 154(b) by 0 days.

(21) Appl. No.: 09/432,620

(22) Filed: Nov. 3, 1999

(30) Foreign Application Priority Data

Nov. 5, 1998 (KR) .................................................. 98-47281

(51) Int. Cl.$^7$ ................................. C08J 5/10; C08K 5/42; C08L 59/02

(52) U.S. Cl. ........................ 524/157; 524/379; 524/210; 524/158

(58) Field of Search ..................................... 524/379, 210, 524/233, 157, 158, 262; 252/500, 510, 511

(56) References Cited

U.S. PATENT DOCUMENTS

| | | | |
|---|---|---|---|
| 4,568,482 | * 2/1986 | Jenekhe et al. | 252/500 |
| 5,035,926 | 7/1991 | Jonas et al. | 427/393.1 |
| 5,391,472 | 2/1995 | Muys et al. | 430/527 |
| 5,662,833 | * 9/1997 | Laakso et al. | 252/500 |
| 5,895,606 | * 4/1999 | Kudoh et al. | 252/500 |

* cited by examiner

Primary Examiner—James J. Seidleck
Assistant Examiner—U. K. Rageuru
(74) Attorney, Agent, or Firm—Fish & Richardson P.C.

(57) ABSTRACT

Disclosed are polythiophene-based conductive polymer liquid compositions of high conductivity and transparency. The compositions comprise 16–32 weight % of an aqueous polythiophene-based conductive polymer solution, 52–80 weight % of an alcohol solvent, 1–12 weight % of an amide solvent, 0.01–0.4 weight % of a sulfonic acid group-containing monomer dopant, and optionally 2–8 weight % of an alkoxysilane. The compositions can be applied to transparent substrates to form coatings which have a surface resistance of 1 kΩ/□ or less and a transmittance of 92% or higher. With the excellent conductivity and transparency, the compositions are useful as electromagnetic wave-shielding materials, finding numerous applications in cathode ray tube screens (TV sets and computer monitors) as well as CPP films, polyethyleneterephthalate films, polycarbonate panels, and acryl panels.

13 Claims, No Drawings

POLYTHIOPHENE-BASED CONDUCTIVE POLYMER LIQUID COMPOSITION OF HIGH CONDUCTIVITY AND TRANSPARENCY

BACKGROUND OF THE INVENTION

1. Description of the invention

The present invention relates to a polythiophene-based polymer liquid composition, which can be formed into a coating with high conductivity and high transparency. More particularly, the present invention is concerned with the use of an amide solvent and a sulfonic acid group ($SO_3H$)-containing monomer dopant in improving the conductivity and transparency of a polythiophene-based polymer liquid composition.

2. Description of the Prior Art

Polyethylenedioxythiophene (PEDT), a conductive polymer, was disclosed as an antistatic property-imparting material, such as an antistatic coating, in U.S. Pat. Nos. 5,035,926 and 5,391,472. Since then, intensive attention has been paid to polymer-based conductive coatings applicable to glass surfaces of Braun tubes.

In terms of electrical conductivity, this conductive polymer has advantages over well-known preexisting polymers, such as polyanilines, polypyrroles and polythiophenes. PEDT also shows excellent processability by virtue of its ability to be easily formed into a coating solution which is dispersible in water, along with salts of polymer acids (e.g., polystyrene sulfonate) as dopants. With this good water dispersibility, PEDT can be well dissolved in alcohol solvents, and the aqueous dispersions find numerous applications in Braun tube (CRT) glasses, plastic film surfaces, etc. The use of water and alcohols as solvents is ecologically very favorable.

Such water-dispersible PEDT polymers are now commercially available, representatively exemplified by Baytron P (Grade A4071) from Bayer.

Highly transparent as they are, conductive PEDT polymers must be coated at low PEDT contents (24% or less based on 1.3 wt % solution) in order to exhibit a transmittance of 92%. Accordingly, it is difficult to achieve a surface resistance of 100 kΩ or less through ordinary techniques. In order to reinforce the strength of PEDT coatings, there is used silica sols prepared from alkoxy silane (e.g., alkyltriethoxysilane), represented by $RSi(OR^1)_3$ wherein R is methyl, ethyl, propyl or isobutyl and $R^1$ is methyl or ethyl. In this case, the conductivity of the resulting coatings is aggravated owing to silica sol. Thus, it is more impossible for existing techniques to produce conductive coatings with a surface resistance of 100 kΩ/□ or less. In fact, current techniques can use PEDT as an antistatic coating material only where low conductivity is required (see technical reference for Baytron P, Bayer).

Therefore, it is virtually impossible for currently prevailing techniques to achieve a transmittance of 92% in addition to a surface resistance of 1 kΩ/□ or less, which satisfies TCO (Tianstemanners Central Organization) Standards for commercially competitive electromagnetic wave-shielding materials.

SUMMARY OF THE INVENTION

Therefore, it is an object of the present invention to overcome the problems encountered in prior arts and to provide a highly conductive and transparent polythiophene-based composition with which a coating having a surface resistance of 1 kΩ/□ or less and a transmittance of 92% can be formed on a transparent substrate.

It is another object of the present invention to provide polythiophene-based compositions useful as electromagnetic wave-shielding materials which are applicable for Braun tube surfaces.

Leading to the present invention, the intensive and thorough research on the development of polythiophene-based compositions of high conductivity and transparency, repeated by the present inventor aiming to satisfy the TCO Standards in surface resistance, resulted in the finding that PEDT conductive polymer solutions can be greatly improved in electrical conductivity by the presence of amide-based organic solvents or sulfonic acid-containing monomer dopants, and even more improved by adding the solvents and the dopants in combination than alone.

DETAILED DESCRIPTION OF THE PRESENT INVENTION

In accordance with a first embodiment of the present invention, there is provided a polythiophene-based polymer liquid composition of high conductivity and transparency comprising 16–32 weight % of an aqueous polythiophene-based conductive polymer solution, 56–82 weight % of an alcohol containing 1–4 carbon atoms, 1–12 weight % of an amide solvent, and 0.01–0.2 weight % of a monomer dopant containing a sulfonic acid group, characterized in that it provides a coating which is 1 kΩ/□ or less in surface resistance, 92% or greater in transmittance, and B or smaller in pencil hardness. The composition of the present invention may be coated on transparent substrates which are used where large hardness is not required. If large hardness is necessary, a silica sol solution may be further applied on the coating of the present invention.

When being coated on transparent substrates, such as lass and synthetic plastic films, the composition of the resent invention promises to show a surface resistance of 1 kΩ/□, a transmittance of 90–98%, and a hardness of 2–9 H.

The conductive polymer useful in the present invention is PEDT, such as that commercially available from Bayer, identified as "Baytron P". Because of being doped with polystyrene sulfonate (PSS), the PEDT polymer is well dissolved in water in addition to exhibiting excellent thermal stability and atmospheric stability. Further, the aqueous polythiophene-based conductive polymer solution was found to maintain optimal water dispersibility when comprising PEDT and PSS at a total solid content of 1.0–1.5 weight %. High solubility in water, alcohol, and solvents of large dielectric constants makes it easy to prepare a coating solution of high coatability. Furthermore, the coatings have a great advantage over those of other conductive polymers, such as polyaniline and polypyrrole, in terms of transparency.

In the polythiophene-based composition, the conductive PEDT polymer is preferably used at an amount of 16–32 weight %. For example, if too little PEDT polymer is used, desired high conductivity, such as a surface resistance of as low as 1 kΩ/□, cannot be achieved no matter how much the amide solvent and the sulfonic acid monomer dopant may be used. On the other hand, an amount greater than 32 weight % causes the resulting coatings to be lower in transmittance than 92% because light is shielded by the characteristic color that the PEDT itself retains.

Serving as a solvent for the conductive PEDT polymer, an alcohol is contained in the composition of the present invention. Useful are alcohols containing 1–4 carbon atoms, exemplified by methanol, ethanol, propanol, isopropanol and butanol. These alcohol solvents may be used alone or in combination. Most preferable is a mixture of two or three alcohols which are different from each other in boiling point. While being vaporized in sequence, the mixed alcohols assure the coating of a highly dispersed state of the PEDT conductive polymer.

Such an alcohol solvent is preferably used at an amount of 56–82 weight %. For example, when the alcohol solvent is used at an amount of less than 56 weight %, the coating is poor in dispersibility. On the other hand, an alcohol amount exceeding 82 weight % brings about a good result in dispersibility, but causes a significant problem in conductivity.

As for the amide solvent useful in the present invention, it is represented by the following formula:

wherein, $R^1$, $R^2$ and $R^3$, which may be the same or different, each denotes H, $CH_3$ or $—CH_2CH_2CH_2—$. Examples of the amide solvents include formamide (FA), N-methylformamide (NMFA), N,N-dimethylformamide (DMF), acetamide (AA), N-methylacetamide (NMAA), N,N-dimethylacetic amide (DMA), N-methylpropion amide (NMPA) and N-methylpyrrolidone.

As well as serve as a solvent in the polythiophene-based polymer solution, the amide compounds, alone or in combination, play a role in increasing conductivity. The increasing effects on conductivity are grouped according to the kinds of amide solvents in Table 1, below.

TABLE 1

Effect of Amide Solvents on Conductivity

| Improving Effect On Conductivity | Group 1 Very Good | Group 2 Good | Group 3 Moderate | Group 4 Small |
|---|---|---|---|---|
| Amide Solvents | FA + NMP<br>FA + NMAA | FA<br>NMP<br>NMAA<br>NMPA<br>NMAA + NMP<br>NMPA + NMP<br>NMPA + NMAA<br>FA + NMPA<br>FA + NMPA | NMFA<br>NMP + DMP<br>NMAA + DMF<br>NMPA + DMF<br>FA + DMF | DMF<br>DMA<br>DMF +<br>NMFA<br>DMA +<br>NMFA |

Generally, as seen in Table 1, better results can be obtained when using such amide solvents, in mixture than when alone. Only the amide solvents can assure a transmittance of 92%, but cannot reduce the surface resistance down to 3 kΩ/□ however much they may improve the conductivity. This is very insufficient for the goal that the present invention intends to achieve. In the present invention, as will be described later, the amide solvents are used in combination with sulfonic acid group-containing monomer dopants, so as to accomplish the desired conductivity, such as a surface resistance of 1 kΩ/□, and the desired transparency, such as a transmittance of 92% or higher. To this end, preferable is Group 1 or 2 of Table 1.

Preferably, the amide solvent is used at an amount of 1–12 weight %. For instance, if present at an amount of less than 1 weight %, the amide solvent cannot allow the surface resistance to be reduced down to 1 kΩ/□ even when increasing the amount of the additionally added dopant. On the other hand, too much amide solvent deleteriously affects the solubility of the dopant, thereby improving the conductivity no more. In addition, because of their high boiling points, the amide solvents, when added at large amounts, force the coatings to be dried at high temperatures, deteriorating the conductivity of the PEDT conductive polymer.

In accordance with the present invention, the PEDT conductive polymer is further doped with monomer dopants containing sulfonic acid groups. Examples of the monomer dopants include p-toluene sulfonic acid (p-TSA), dodecylbenzene sulfonic acid (DOBSA), 1,5-anthraquinonedisulfonic acid (1,5-AQSA), anthraquinonesulfonic acid (AQSA), 4-hydroxybenzene sulfonic acid (4-HBSA), methylsulfonic acid (MSA) and nitrobenzene sulfonic acid (NBSA). In the case that the monomer dopants exist as salts, such as sodium salts, they can be converted to acid forms using a nitric acid solution (pH 2). For use, the dopants in an acid form are made into an aqueous solution which has a concentration of 1–4 weight % and preferably 1–2 weight %. When being added with their phase in an aqueous solution form, the monomer dopants are more uniformly dispersed throughout the conductive polymer, so as to bring about better results in conductivity and coating uniformity, than when being added with their phase in a solid form (or crude liquid form). The dopants stabilize charges in the PEDT conductive polymers, giving a great contribution to the conductivity of the polymers. Advantageous in the aspect of conductivity are dopants which are small in molecular size, like p-TSA, 4-HBSA and NBSA. The dopants are preferably used at an amount of 0.01–0.2 weight % based on the weight of the composition. For instance, when the dopants are added at an amount of more than 0.2 weight %, the dopants make coatings rather decrease than increase in conductivity while being poorly dispersed in the coatings. On the other hand, when too little dopants are used, it is virtually impossible to approach the desired conductivity, that is, a surface resistance of 1 kΩ/□.

The polythiophene-based, conductive polymer composition of high conductivity and transparency may be prepared by adding a PEDT conductive polymer with a sulfonic acid monomer dopant, an alcohol solvent and an amide solvent, in due order, at intervals of 1 min with vigorous stirring, and mixing them homogeneously for 2–4 hours.

From this polythiophene-based, conductive polymer composition, there can be formed highly transparent and conductive coatings which are capable of shielding electromagnetic waves. For this, first, the polythiophene-based, conductive polymer compositions according to the present invention are poured on transparent substrates, such as cathode ray tube screens (TV sets and computer monitors), CPP (casting polypropylene) films, polyethyleneterephthalate films, polycarbonate panels, and acryl panels, and uniformly spread by a bar coating or spin coating manner, followed by drying at 80–200° C. for 30 min–1 hr in an oven. As a result, there are obtained polythiophene coatings of high conductivity which are of low hardness and useful for shielding electromagnetic waves.

In accordance with a second embodiment of the present invention, there is provided a polythiophene-based polymer liquid composition of high conductivity and transparency comprising 16–32 weight % of an aqueous polythiophene-based conductive polymer solution, 2–8 weight % of an alkoxy silane, 52–80 weight % of an alcohol containing 1–4 carbon atoms, 1–8 weight % of an amide solvent, and 0.01–0.4 weight % of a monomer dopant containing a sulfonic acid group, characterized in that it provides a coating which is 1 kΩ/□ or less in surface resistance, 92% or greater in transmittance, and 2H or greater in pencil hardness. The composition of the present invention may be coated on transparent substrates which are used where large hardness is required. If larger hardness is necessary, a 100% silica sol solution may be further applied on the coating of the present invention to allow the coating to have a hardness of as high as 9H.

The conductive polymer useful in this embodiment is PEDT, such as that commercially available from Bayer, identified as "Baytron P". By virtue of being doped with polystyrene sulfonate (PSS), the PEDT polymer is well dissolved in water in addition to exhibiting excellent thermal stability and atmospheric stability. Further, the aqueous polythiophene-based conductive polymer solution can maintain optimal water dispersibility when comprising PEDT and PSS at a total solid content of 1.0–1.5 weight %. Its high solubility in water, alcohol, and solvents of large dielectric constants makes it easy to prepare a coating solution of high coatability. Furthermore, the coatings have a great advantage over those of other conductive polymers, such as polyaniline and polypyrrole, in terms of transparency.

In the polythiophene-based composition, the conductive PEDT polymer is preferably used at an amount of 16–32 weight %. For example, if too little PEDT polymer is used, desired high conductivity, such as a surface resistance of as low as 1 k$\Omega$/□, cannot be achieved no matter how much the amide solvent and the sulfonic acid monomer dopant may be used. On the other hand, an amount greater than 32 weight % causes the resulting coatings to be lower in transmittance than 92% because light is shielded by the characteristic color that the PEDT itself retains.

Serving as a solvent for the conductive PEDT polymer, an alcohol is contained in the composition according to the present invention. Useful are alcohols containing 1–4 carbon atoms, exemplified by methanol, ethanol, propanol, isopropanol and butanol. These alcohol solvents may be used alone or in combination. Most preferable is a mixture of two or three alcohols which are different from each other in boiling point. While being vaporized in sequence, the mixed alcohols assure the coating of a highly dispersed state of the PEDT conductive polymer.

Such an alcohol solvent is preferably used at an amount of 52–80 weight %. For example, when the alcohol solvent is used at an amount of less than 52 weight %, the coating is poor in dispersibility. On the other hand, an alcohol amount exceeding 80 weight % brings about a good result in dispersibility, but causes a significant problem in conductivity.

Being formed into silica sol in the present invention, the alkoxysilane is preferably selected from alkyltrialkoxysilane (RSi(OR')$_3$, wherein R' is methyl or ethyl and R is methyl, ethyl, or propyl) and tetraalkoxylsilane (Si(OR')$_4$, wherein R' is methyl or ethyl). Preferable amounts of the alkoxysilane are within the range of 2–8 weight %. For example, an amount less than 2 weight % does not assure a hardness of 2H. On the other hand, when too much alkoxysilane is used, the coating has high hardness, but poor conductivity. In this case, the composition is relatively rich in silica sol and the coating obtained after the composition is coated and thermally cured, and is also rich in non-conductive polysilicate as a result of the condensation of the silica sol. In addition, too much alkoxysilane is problematic in the aspect of dispersion.

As for the amide solvent useful in the present invention, it is represented by the following formula:

$R^1(CO)NR^2R^3$ wherein, $R^1$, $R^2$ and $R^3$, which may be the same or different, each denotes H, CH$_3$ or —CH$_2$CH$_2$CH$_2$—. Examples of the amide solvents include formamide (FA), N-methylformamide (NMFA), N,N-dimethylformamide (DMF), acetamide (AA), N-methylacetamide (NMAA), N,N-dimethylacetic amide (DMA), N-methylpropion amide (NMPA) and N-methylpyrrolidone.

In addition to serving as a solvent in the polythiophene-based polymer solution, the amide compounds, alone or in combination, play a role in increasing conductivity. The increasing effects on conductivity are grouped according to the kinds of amide solvents in Table 1. Generally, as seen in Table 1, better results can be obtained when using such amide solvents in mixture than when alone. Only the amide solvents can assure a transmittance of 92%, but cannot reduce the surface resistance down to 3 k$\Omega$/□ no matter how much they may improve the conductivity. This is very insufficient for the goal that the present invention intends to achieve. In the present invention, as will be described later, the amide solvents are used in combination with sulfonic acid group-containing monomer dopants, so as to accomplish the desired conductivity, such as a surface resistance of 1 k$\Omega$/□, and the desired transparency, such as a transmittance of 92% or higher. To this end, preferable is Group 1 or 2 of Table 1.

Preferably, the amide solvent is used at an amount of 1–8 weight %. For instance, too much amide solvent deleteriously affects the solubility of the dopant so that a desired conductivity cannot be accomplished. In addition, because of their high boiling points, the amide solvents, when added at large amounts, force the coatings to be dried at high temperatures, deteriorating the conductivity of the PEDT conductive polymer. On the other hand, if present at an amount of less than 1 weight %, the amide solvent cannot allow the surface resistance to be reduced down to 1 k$\Omega$/□.

In accordance with the present invention, the PEDT conductive polymer is further doped with monomer dopants containing sulfonic acid groups. Examples of the monomer dopants include p-toluene sulfonic acid (p-TSA), dodecylbenzene sulfonic acid (DOBSA), 1,5-anthraquinonedisulfonic acid (1,5-AQSA), anthraquinonesulfonic acid (AQSA), 4-hydroxybenzene sulfonic acid (4-HBSA), methylsulfonic acid (MSA) and nitrobenzene sulfonic acid (NBSA). Preferable amounts of the dopants are within the range of 0.01–0.4 weight %. For instance, when the dopants are added at an amount of more than 0.4 weight %, the dopants make coatings decrease rather than increase in conductivity while being poorly dispersed in the coatings. On the other hand, when the amount of the dopants are below 0.1 weight %, it is virtually impossible to approach the desired conductivity, that is, a surface resistance of 1 k$\Omega$/□. In the case that the monomer dopants exist as salts, such as sodium salts, they can be converted to acid forms using a nitric acid solution (pH 2). For use, the dopants in an acid form are made into an aqueous solution which has a concentration of 1–4 weight % and preferably 1–2 weight %. When being added with their phase in an aqueous solution form, the monomer dopants are more uniformly dispersed throughout the conductive polymer, so as to bring about better results in conductivity and coating uniformity, than when being added with their phase in a solid form (or crude liquid form). The dopants stabilize charges in the PEDT conductive polymers, giving a great contribution to the conductivity of the polymers. Advantageous in the aspect of conductivity are dopants which are small in molecular size, like p-TSA, 4-HBSA and NBSA.

The composition of the present invention may be prepared in two mixing processes: two-step mixing process (Process 1) and direct mixing process (Process 2). The two-step mixing process (Process 1) comprises a first step of preparing a silica sol solution and a second step of preparing a silica sol-PEDT mixture solution. In the first step, the silica sol solution is prepared by mixing alkoxysilane, an alcohol solvent and water for 8–12 hours at room temperature. The mixing of the silica sol solution with a PEDT solution (for example, 1.3 weight %), a sulfonic acid group-containing monomer dopant solution, and an amide solvent for 4–6 hours at room temperature produces a PEDT solution of high hardness and conductivity, leading to the second step.

As for the direct mixing process (Process 2), it comprises mixing a PEDT solution (for example, 1.3 weight %), alkoxysilane, an alcohol solvent, an amide solvent and a sulfonic acid group-containing monomer dopant solution all together for 6–10 hours to give a PEDT solution of high hardness and conductivity.

Either of these two mixing processes (Process 1 and Process 2) may be employed to prepare the polythiophene-based conductive polymer liquid composition of high conductivity and transparency according to the present invention with preference to Process 2 (the direct mixing process) in an aspect of hardness.

From this polythiophene-based, conductive polymer liquid composition, there can be formed highly transparent, hard and conductive coatings which are capable of shielding electromagnetic waves. For this, first, the polythiophene-based, conductive polymer compositions according to the second embodiment of the present invention are poured on transparent substrates, such as cathode ray tube screens (TV sets and computer monitors), and uniformly spread by a bar coating or spin coating manner, followed by drying at 150–180° C. for 0.5–1 hour in an oven. As a result, there are obtained polythiophene coatings of high conductivity which are of high hardness and useful for shielding electromagnetic waves.

A better understanding of the present invention may be obtained in light of the following examples which are set forth to illustrate, but are not to be construed to limit the present invention.

EXAMPLES I TO XIV AND COMPARATIVE EXAMPLES I TO V

Polythiophene-based conductive polymer liquid compositions which could be used to form coatings of high transparency and conductivity and low hardness, according to the present invention, were prepared as indicated in Table 2, below. For comparison, only one amide solvent was used, only one sulfonic acid monomer was used, or amounts of components were not in the range suggested in the invention.

The aqueous conductive polymer solution used in these examples was Baytron P (Grade A4071) (solid content 1.3 wt %) of Bayer. For the methanol and ethanol, the products purchased from Aldrich were used without modification. The sulfonic acid monomer dopants, P-TSA, 1,5-AQSA, 2,6-AQSA, 4-HBSA and NBSA, which were used to dope the polymer, were in a salt form when being purchased from Aldrich. For use, they were dissolved in water to give 1 wt % solutions and then converted to acid forms by use of a nitric acid solution (pH 2). Indicated in Table 2 were the amounts of aqueous 1 wt % solutions of the monomer dopants.

Aqueous PEDT conductive polymer solutions (PEDT (aq)) were added with sulfonic acid monomer dopant solutions, alcohol, and amide solutions in sequence with vigorous stirring. After completion of the addition, the solutions were further stirred for about 2 hours to give coating solutions. These solutions were spin-coated on glass surfaces, which had been washed with acid and dried, and subjected to drying at 120° C. for 30 min in an oven to form coatings 0.5μ or less thick.

The coatings were measured for physical properties and the results are given in Table 2. In this regard, an ohm meter was used for surface resistance. The transparency of the coatings was evaluated by measuring their transmittance at 550 nm with a UV-visible meter. Pencil hardness was introduced to represent the hardness of the coatings.

TABLE 2

| | | Physical Properties of Coating | | | |
|---|---|---|---|---|---|
| Ex. Nos. | PEDT/Alcohol/ Amide/Dopant (wt %) | Surface Resist. (KΩ/□) | Transmittance (T %) | Hardness (H) | Uniformity |
| 1 | PEDT(aq)/MeOH/FA/NMP/ p-TSA (20/72/2/1/5) | 0.9 | 97 | ≦B | Good |
| 2 | PEDT(aq)/MeOH/FA/NMP/ p-TSA (24/68/2/1/5) | 0.7 | 95 | ≦B | Good |
| 3 | PEDT(aq)/MeOH/FA/NMP/ p-TSA (30/62/2/1/5) | 0.65 | 93 | ≦B | Good |
| 4 | PEDT(aq)/MeOH/FA/NMP/ 1,5-AQSA (24/68/2/1/5) | 0.85 | 94 | ≦B | Good |
| 5 | PEDT(aq)/MeOH/FA/NMP/ 2,6-AQSA (24/68/2/1/5) | 0.90 | 94 | ≦B | Good |
| 6 | PEDT(aq)/MeOH/FA/NMP/ 4-HBSA (24/68/2/1/5) | 0.75 | 94 | ≦B | Good |
| 7 | PEDT(aq)/MeOH/FA/NMP/ NBSA (24/68/2/1/5) | 0.80 | 94 | ≦B | Good |
| 8 | PEDT(aq)/MeOH/FA/ NMAA/p-TSA (24/68/2/1/5) | 0.65 | 94 | ≦B | Good |
| 9 | PEDT(aq)/EtOH/FA/NMP/ 4-HBSA (24/68/2/1/5) | 0.75 | 94 | ≦B | Good |
| 10 | PEDT(aq)/MeOH/FA/NMP/ 4-HBSA (24/65/4/2/5) | 0.70 | 95 | ≦B | Good |
| 11 | PEDT(aq)/MeOH/FA/NMP/ 4-HBSA (24/60/4/2/10) | 0.75 | 93 | ≦B | Very good |
| 12 | PEDT(aq)/MeOH/FA/NMP/ 4-HBSA (24/64/4/3/5) | 0.80 | 93 | B | Good |
| 13 | PEDT(aq)/MeOH/NMAA/ NMP/4-HBSA (24/68/2/1/5) | 0.85 | 94 | B | Good |
| 14 | PEDT(aq)/MeOH//NMPA/ NMAA/4-HBSA (24/68/2/1/5) | 0.88 | 94 | B | Good |
| 1 | PEDT(aq)/MeOH/FA/NMP (24/73/2/1) | 4 | 95 | B | Good |
| 2 | PEDT(aq)/MeOH/p-TSA (24/71/5) | 20 | 92 | B | Good |
| 3 | PEDT(aq)/MeOH/NMPA/ NMAA/4-HBSA (36/56/2/1/5) | 0.5 | 90 | B | Good |
| 4 | PEDT(aq)/MeOH/NMPA/ NMAA/4-HBSA (24/57/7/7/5) | 0.8 | 95 | B | Poor (whitening) |
| 5 | PEDT(aq)/MeOH/NMPA/ NMAA/4-HBSA (24/43/1/2/30) | 2 | 92 | B | Poor (black spot) |

As apparent from the data of Table 2, the compositions deviated from the scope of the present invention were found to be poor in all of conductivity, transmittance and dispersibility.

It should be noted that the compositions suggested in Table 2 are set forth to illustrate the invention, but do not limit the scope of the present invention.

EXAMPLES XV TO XXXI AND COMPARATIVE EXAMPLES VI TO XII

Polythiophene-based conductive polymer liquid compositions which could be used to form coatings of high transparency and conductivity and hardness, according to the present invention, were prepared as indicated in Table 3, below. For comparison, only one amide solvent was used, only one sulfonic acid monomer was used, or amounts of components were not in the range suggested in the invention. The aqueous conductive polymer solutions, alcohol solvents, amide solvents, sulfonic acid monomer dopants used in these examples were the same as those of Table 2. For alkoxysilane, tetraethoxysilane (TEOS) and MTEOS were used without modification of the products of Aldrich.

For the coatings of Examples XV to XVII, the solutions which were prepared through the direct mixing process (Process 2) were used. The solutions were mixed for about 8 hours at room temperature. The solutions for the coatings of Examples XVIII to XXXI were prepared by the two-step mixing process (Process 1). The mixing for the silica sol solution (step 1) and the silica sol-PEDT conductive polymer solution (step 2) were carried out for 10 hours and 5 hours, respectively.

The preparation of coatings and the measurement of their physical properties followed the procedures of Example I. The results are given in Table 3, below.

TABLE 3

| | | Physical Properties of Coating | | | |
|---|---|---|---|---|---|
| Ex. Nos. | PEDT/Alcohol/ Amide/Dopant(wt %) | Surface Resist. (KΩ/□) | Transmittance (T %) | Hardness (H) | Uniformity |
| 15 | PEDT(aq)/TEOS/MeOH/FA/ NMP/p-TSA (20/4/63/2/1/10) | 0.95K | 97 | 9 | Good |
| 16 | PEDT(aq)/TEOS/MeOH/FA/ NMP/p-TSA (24/4/59/2/1/10) | 0.80K | 95 | 7 | Good |
| 17 | PEDT(aq)/TEOS/MeOH/FA/ NMP/p-TSA (30/4/53/2/1/10) | 0.78K | 92 | 7 | Good |
| 18 | PEDT(aq)/TEOS/MeOH/FA/ NMP/p-TSA (20/4/63/2/1/10) | 0.98K | 96 | 6 | Good |
| 19 | PEDT(aq)/TEOS/MeOH/FA/ NMP/p-TSA (24/4/59/2/1/10) | 0.85K | 95 | 4 | Good |
| 20 | PEDT(aq)/TEOS/MeOH/FA/ NMP/p-TSA (30/4/53/2/1/10) | 0.83K | 92 | 2 | Good |
| 21 | PEDT(aq)/TEOS/MeOH/FA/ NMP/1.5-AQSA (26/4/57/2/1/10) | 0.83K | 95 | 4 | Good |
| 22 | PEDT(aq)/TEOS/MeOH/FA/ NMP/2.6-AQSA (26/4/57/2/1/10) | 0.85K | 95 | 4 | Good |
| 23 | PEDT(aq)/TEOS/MeOH/FA/ NMP/4-HBSA (26/4/57/2/1/10) | 0.82K | 95 | 4 | Good |
| 24 | PEDT(aq)/TEOS/MeOH/FA/ NMP/NBSA (26/4/57/2/1/10) | 0.83K | 95 | 4 | Good |
| 25 | PEDT(aq)/TEOS/MeOH/FA/ NMAA/p-TSA (26/4/57/2/1/10) | 0.80K | 95 | 4 | Good |
| 26 | PEDT(aq)/TEOS/EtoH/FA/ NMP/4-HBSA (26/4/57/2/1/10) | 0.82K | 94 | 4 | Good |
| 27 | PEDT(aq)/TEOS/MeOH/FA/ NMP/4-HBSA (26/4/54/4/2/10) | 0.80 | 96 | 4 | Good |
| 28 | PEDT(aq)/TEOS/MeOH/FA/ NMP/4-HBSA (26/4/59/4/2/5) | 0.82 | 94 | 4 | Very good |
| 29 | PEDT(aq)/TEOS/MeOH/ NMAA/NMP/4-HBSA (26/4/57/2/1/10) | 0.90 | 94 | 4 | Good |
| 30 | PEDT(aq)/TEOS/MeOH/ NMPA/NMAA/4-HBSA (26/4/57/2/1/10) | 0.90 | 94 | 4 | Good |
| 31 | PEDT(aq)MTEOS/TEOS/ MeOH/FA/NMP/4-HBSA (26/1/3/57/2/1/10 | 0.85 | 94 | 3 | Good |
| 6 | PEDT(aq) TEOS/MeOH/ FA/NMP (26/4/67/2/1) | 6K | 95 | B | Good |
| 7 | PEDT(aq)/TEOS/MeOH/ p-TSA (26/4/60/10) | 10K | 92 | B | Good |
| 8 | PEDT(aq)/TEOS/MeOH/FA/ NMP/4-HBSA (36/4/47/2/1/10) | 1K | 90 | B | Good |
| 9 | PEDT(aq)/TEOS/MeOH/FA/ NMP/4-HBSA (26/6/48/4/6/10) | 0.9K | 95 | B | Poor (whitening) |
| 10 | PEDT(aq)/TEOS/MeOH/FA/ NMP/4-HBSA (26/4/22/1/2/45) | 0.95K | 92 | B | Poor (black spot) |
| 11 | PEDT(aq)/TEOS/MeOH/FA/ NMP/p-TSA (26/1/60/1/2/10) | 0.78 | 95 | 1 | Good |
| 12 | PEDT(aq)/TEOS/MeOH/FA/ NMP/p-TSA (26/10/51/1/2/10) | 6K | 94 | 6 | Poor |

As described hereinbefore, the polythiophene-based, conductive polymer liquid compositions of the present invention can be applied to transparent substrates, such as glass and synthetic plastic films, to form coatings which have a surface resistance of 1 kΩ/□ or less, meeting the TCO standards, established by the Laborer Association of Sweden, which are the strictest regulations in the world concerning the shielding of electromagnetic waves. When using alkoxysiliane, the coatings thus obtained range, in surface resistance, from 0.54 to 1 kΩ/□, in transmittance from 92 to 97%, and, in pencil hardness from 2 to 9 H. With the high conductivity, transparency and hardness, the polythiophene-based conductive polymer liquid compositions of the present invention are therefore useful as electromagnetic wave-shielding materials. The compositions find numerous applications in cathode ray tube screens (TV sets and computer monitors) as well as CPP films, polyethyleneterephthalate films, polycarbonate panels, and acryl panels.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A polythiophene-based conductive polymer liquid composition of high conductivity and transparency, comprising:
   16–32 weight % of an aqueous polythiophene-based conductive polymer solution;
   56–82 weight % of an alcohol solvent;
   1–12 weight % of an amide solvent; and
   0.01–0.2 weight % of a sulfonic acid group-containing monomer dopant.

2. A polythiophene-based conductive polymer liquid composition as set forth in claim 1, wherein the aqueous conductive polymer solution is an aqueous polyethylenedioxythiophene solution.

3. A polythiophene-based conductive polymer liquid composition as set forth in claim 1, wherein the aqueous conductive polymer solution has a solid content of 1.0–1.5 weight %.

4. A polythiophene-based conductive polymer liquid composition as set forth in claim 1, wherein the alcohol contains 1–4 carbon atoms.

5. A polythiophene-based conductive polymer liquid composition as set forth in claim 1, wherein the amide solvent is selected from the group consisting of formamide, N-methylformamide, N,N-dimethylformamide, acetamide, N-methylacetamide, N,N-dimethylacetic amide, N-methylpropion amide, N-methylpyrrolidone, and mixtures thereof.

6. A polythiophene-based conductive polymer liquid composition as set forth in claim 1, wherein the sulfonic acid group-containing monomer dopant is selected from the group consisting of p-toluene sulfonic acid, dodecylbenzene sulfonic acid, 1,5-anthraquinonedisulfonic acid, anthraquinonesulfonic acid, 4-hydroxybenzene sulfonic acid, methylsulfonic acid and nitrobenzene sulfonic acid.

7. A polythiophene-based conductive polymer liquid composition of high conductivity and transparency, comprising:

16–32 weight % of an aqueous polythiophene-based conductive polymer solution;

2–8 weight % of an alkoxysilane;

52–80 weight % of an alcohol solvent;

1–8 weight % of an amide solvent; and 0.01–0.4 weight % of a sulfonic acid group-containing monomer dopant.

8. A polythiophene-based conductive polymer liquid composition set forth in claim 7, wherein the aqueous polythiophene-based conductive polymer solution is an aqueous polyethylenedioxythiophene solution.

9. A polythiophene-based conductive polymer liquid composition as set forth in claim 7, wherein the aqueous conductive polymer solution has a solid content of 1.0–1.5 weight %.

10. A polythiophene-based conductive polymer liquid composition as set forth in claim 7, wherein the alkoxysilane is a tetraalkoxysilane or alkyltrialkoxysilane, represented by the following chemical formulas 1 and 2, respectively:

$$Si(OR^1)_4 \qquad (1)$$

$$RSi(OR^1)_3 \qquad (2)$$

wherein, R is methyl, ethyl, propyl or isobutyl; $R^1$ is methyl or ethyl.

11. A polythiophene-based conductive polymer liquid composition as set forth in claim 7, wherein the alcohol contains 1–4 carbon atoms.

12. A polythiophene-based conductive polymer liquid composition as set forth in claim 7, wherein the amide solvent is selected from the group consisting of formamide, N-methylformamide, N,N-dimethylformamide, acetamide, N-methylacetamide, N,N-dimethylacetic amide, N-methylpropion amide, N-methylpyrrolidone, and mixtures thereof.

13. A polythiophene-based conductive polymer liquid composition as set forth in claim 7, wherein the sulfonic acid group-containing monomer dopant is selected from the group consisting of p-toluene sulfonic acid, dodecylbenzene sulfonic acid, 1,5-anthraquinonedisulfonic acid, anthraquinonesulfonic acid, 4-hydroxybenzene sulfonic acid, methylsulfonic acid and nitrobenzene sulfonic acid.

* * * * *